United States Patent
Ceci et al.

(10) Patent No.: US 11,814,250 B2
(45) Date of Patent: Nov. 14, 2023

(54) AIR-POWERED CONVEYOR BELT CLEANER FOR SMALL DEBRIS AND PARTICLES

(71) Applicant: Crossford International, LLC, Stamford, CT (US)

(72) Inventors: Victor A. Ceci, Stamford, CT (US); Gregory Wyatt, Stamford, CT (US); Evan Reyes, Stamford, CT (US)

(73) Assignee: Crossford International, LLC, Stamford, CT (US)

( * ) Notice: Subject to any disclaimer, the term of this patent is extended or adjusted under 35 U.S.C. 154(b) by 18 days.

(21) Appl. No.: 18/146,494

(22) Filed: Dec. 27, 2022

(65) Prior Publication Data

US 2023/0133864 A1 May 4, 2023

(51) Int. Cl.
*B65G 45/22* (2006.01)
*B65G 45/26* (2006.01)
*B65G 45/24* (2006.01)

(52) U.S. Cl.
CPC .............. *B65G 45/22* (2013.01); *B65G 45/24* (2013.01); *B65G 45/26* (2013.01)

(58) Field of Classification Search
CPC .......... B65G 45/22; B65G 45/24; B65G 45/26
USPC ....................................................... 198/495
See application file for complete search history.

(56) References Cited

U.S. PATENT DOCUMENTS

| | | | | | |
|---|---|---|---|---|---|
| 4,960,200 | A | * | 10/1990 | Pierce | B65G 45/24 198/502.1 |
| 5,355,992 | A | * | 10/1994 | Baig et al. | B65G 45/22 198/497 |
| 6,971,503 | B2 | * | 12/2005 | Thompson | B65G 45/22 198/496 |
| 7,044,287 | B1 | * | 5/2006 | Gray | B65G 45/22 198/494 |
| 7,077,260 | B2 | * | 7/2006 | Saballus | B65G 45/22 134/122 R |
| 10,150,623 | B2 | * | 12/2018 | Handy | B05B 13/0478 |
| 11,485,585 | B1 | * | 11/2022 | Bitondo et al. | A21B 3/16 |

* cited by examiner

*Primary Examiner* — Mark A Deuble
(74) *Attorney, Agent, or Firm* — Tatonetti IP

(57) ABSTRACT

An air-powered conveyor belt cleaner is configured with a spinner manifold with cleaning heads having nozzles that output air against a conveyor belt and an opposing catch tray assembly that catches dislodged sesame seeds and small debris or particles from the cleaned conveyor belt. A hanging bracket attaches to opposing sides of the conveyor belt's frame and uses rollers to direct the conveyor belt in a temporarily vertical direction while the air-powered conveyor belt cleaner operates. Once the conveyor belt is vertically-oriented, plant air is directed to inlets at the spinner manifold, which is then output through nozzles perpendicularly arranged relative to the conveyor belt. The cleaning heads are adapted to rotate while operating to increase the agitation against the conveyor belt. The tips of the nozzles/tubes are bent at an obtuse angle to create a thrust caused by the output air.

20 Claims, 13 Drawing Sheets

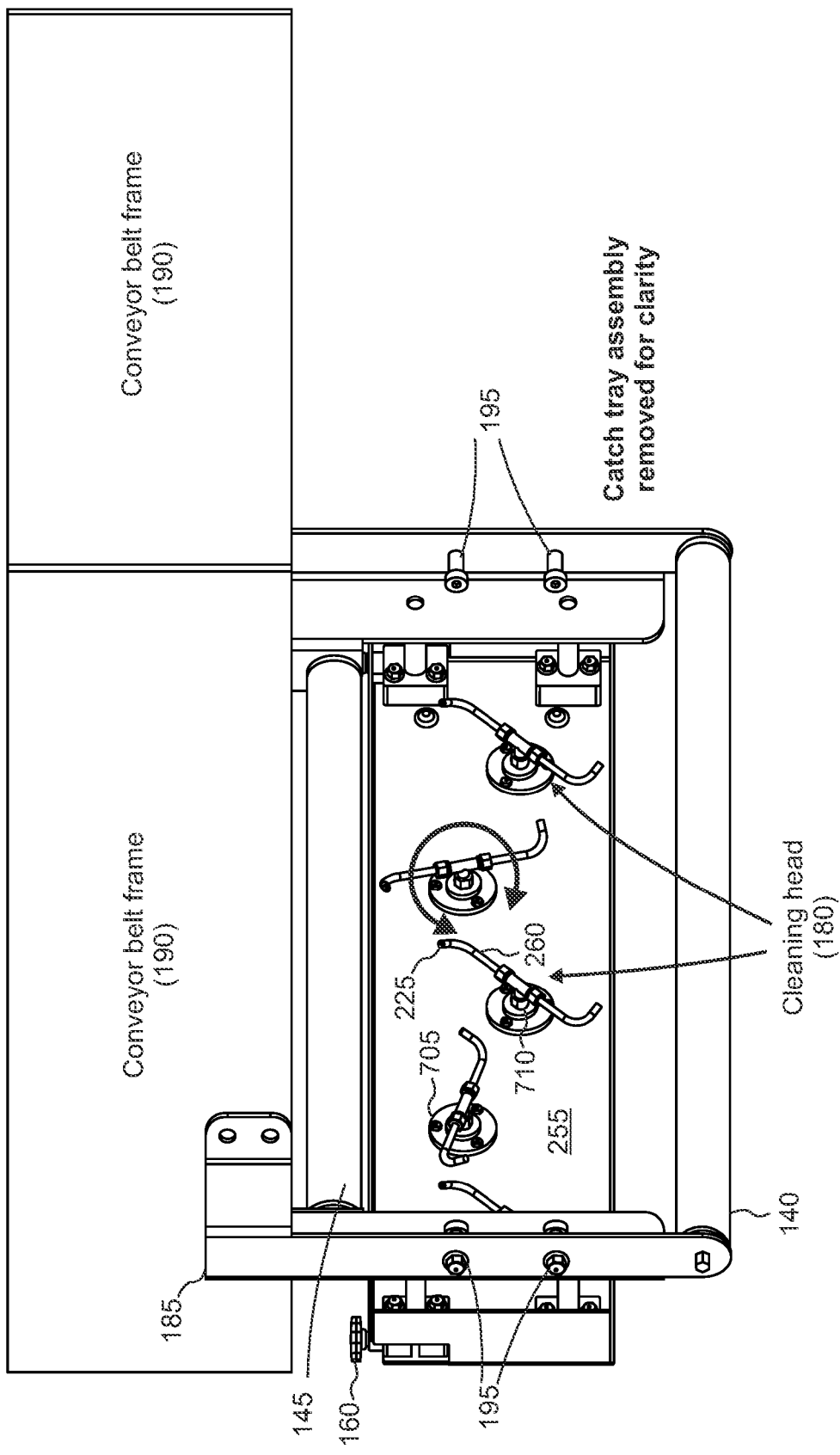

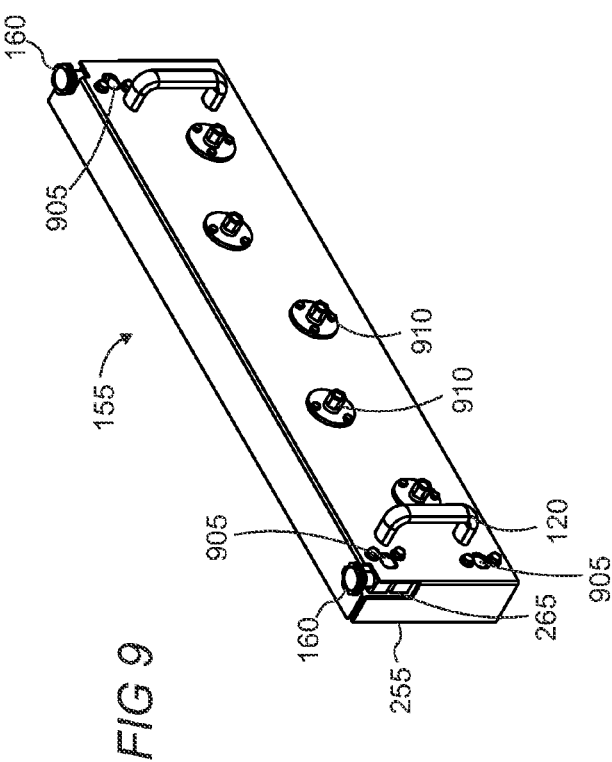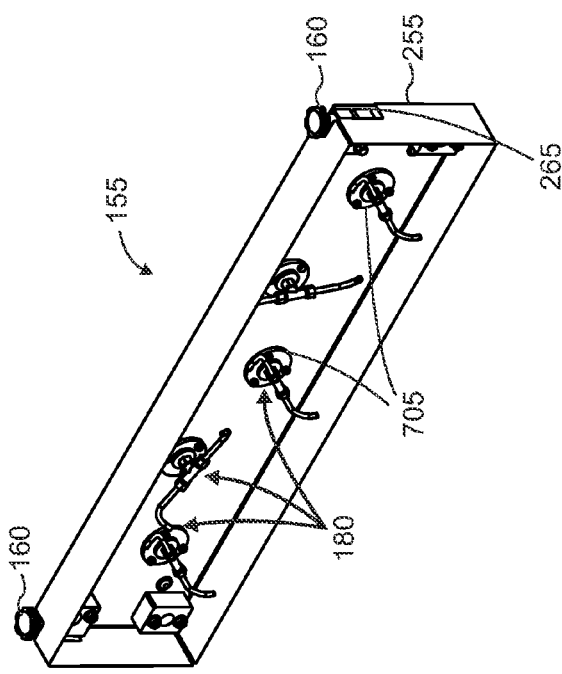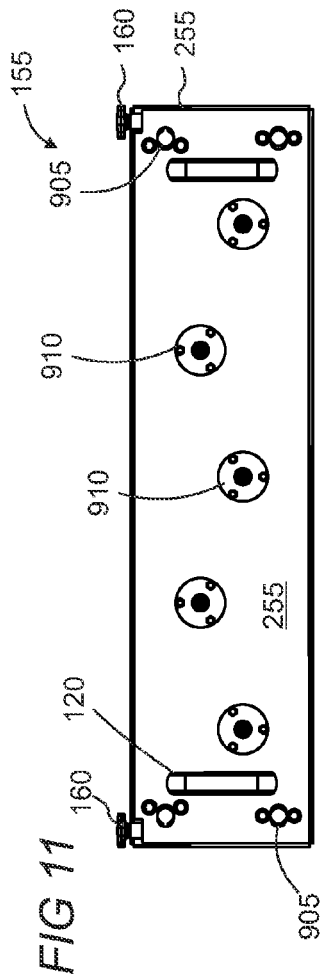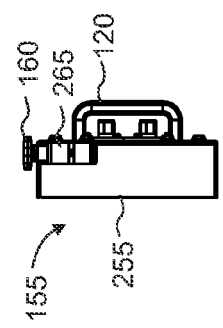

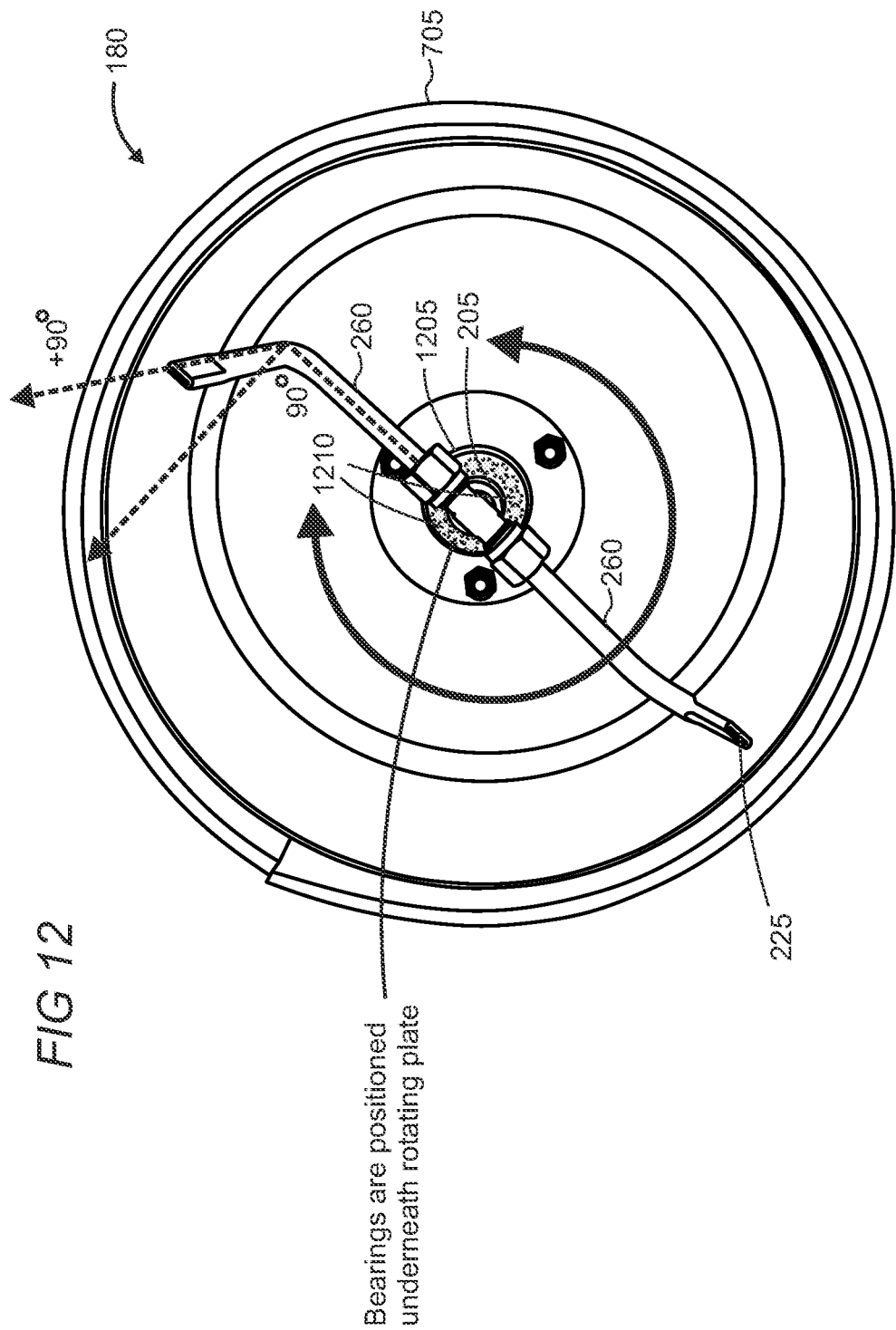

AIR-POWERED CONVEYOR BELT CLEANER FOR SMALL DEBRIS AND PARTICLES

BACKGROUND

Conveyor belt cleaning systems can deploy motorized cleaning heads that spray some material against a dirtied conveyor belt. Some cleaning heads are configured with brushes to mechanically clean the dirtied conveyor belts. Typical conveyor belt cleaning systems may be inadequate for cleaning certain types of conveyor belts and/or debris particles, such as sesame seeds, that get stuck within a conveyor belt's openings or apertures.

SUMMARY

An air-powered conveyor belt cleaner is configured with a spinner manifold with cleaning heads having nozzles that output air against a conveyor belt and an opposing catch tray assembly that catches dislodged sesame seeds and small debris or particles from the cleaned conveyor belt. A hanging bracket attaches to opposing sides of the conveyor belt's frame and uses rollers to direct the conveyor belt in a temporarily vertical direction while the air-powered conveyor belt cleaner operates. Once the conveyor belt is vertically-oriented, plant air is directed to inlets at the spinner manifold, which is then output through nozzles perpendicularly arranged relative to the conveyor belt. The cleaning heads are adapted to rotate while operating to increase the agitation against the conveyor belt. The tips of the nozzles/tubes are bent at an obtuse angle to create a thrust caused by the output air, thereby obviating the need, at least in some scenarios, for a motor for rotational movement. While air is discussed throughout the disclosure, the cleaning heads and system is also capable of outputting other media, including steam, water, sanitizing solution, dry ice crystals, etc. Each one of which can cause the functionality for air discussed herein, but may be better suited depending on the type of debris or particles intended to be cleaned on the conveyor belt, or depending on the conveyor belt's material itself.

As output air engages with the conveyor belt's mesh makeup, seeds and other small debris are dislodged and escape on a side opposite the spinner manifold into the catch tray assembly. The catch tray assembly, with a minimized distance from the conveyor belt, includes an angled backstop to direct any crashing debris downward toward a base. The base includes a lip adjacent to the conveyor belt to prevent any caught debris from escaping. A vacuum port adjacent to or at the base of the catch tray assembly is adapted to receive a vacuum to suction out any caught debris and enable the continuous operation of the conveyor belt cleaner.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture, such as one or more computer-readable storage media. These and various other features will be apparent from reading the following Detailed Description and reviewing the associated drawings.

DESCRIPTION OF THE DRAWINGS

FIG. 7 shows an illustrative rear perspective view of the backplate with the backplate and conveyor belt removed to show the front of the air-powered cleaning heads;

FIGS. 8-11 show illustrative representations of the air-powered cleaning head assembly from different angles;

FIG. 12 shows an illustrative representation of the nozzles for an air-powered cleaning head;

DETAILED DESCRIPTION

Figure 1:
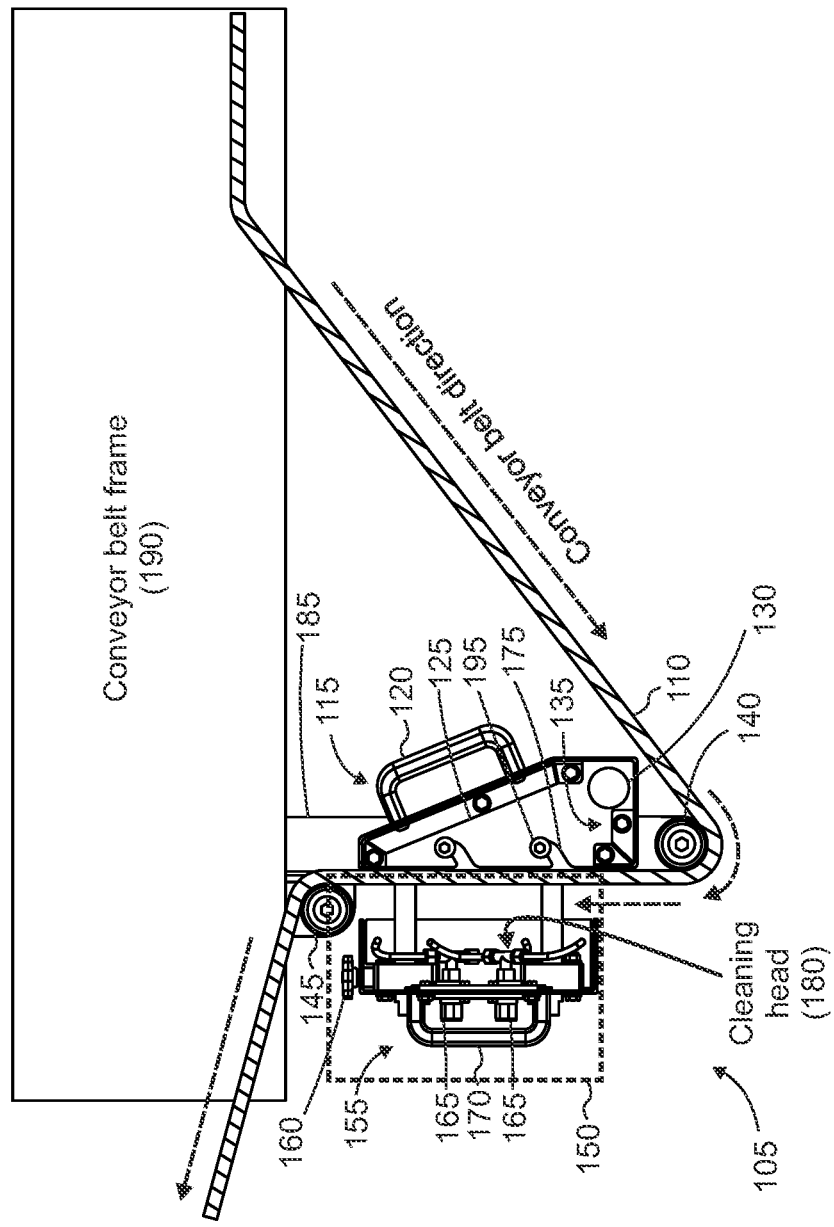
FIG. 1 shows an illustrative diagram of a conveyor belt cleaning system configured to rid a conveyor belt of sesame seeds and other smaller particles.
Figure 2:
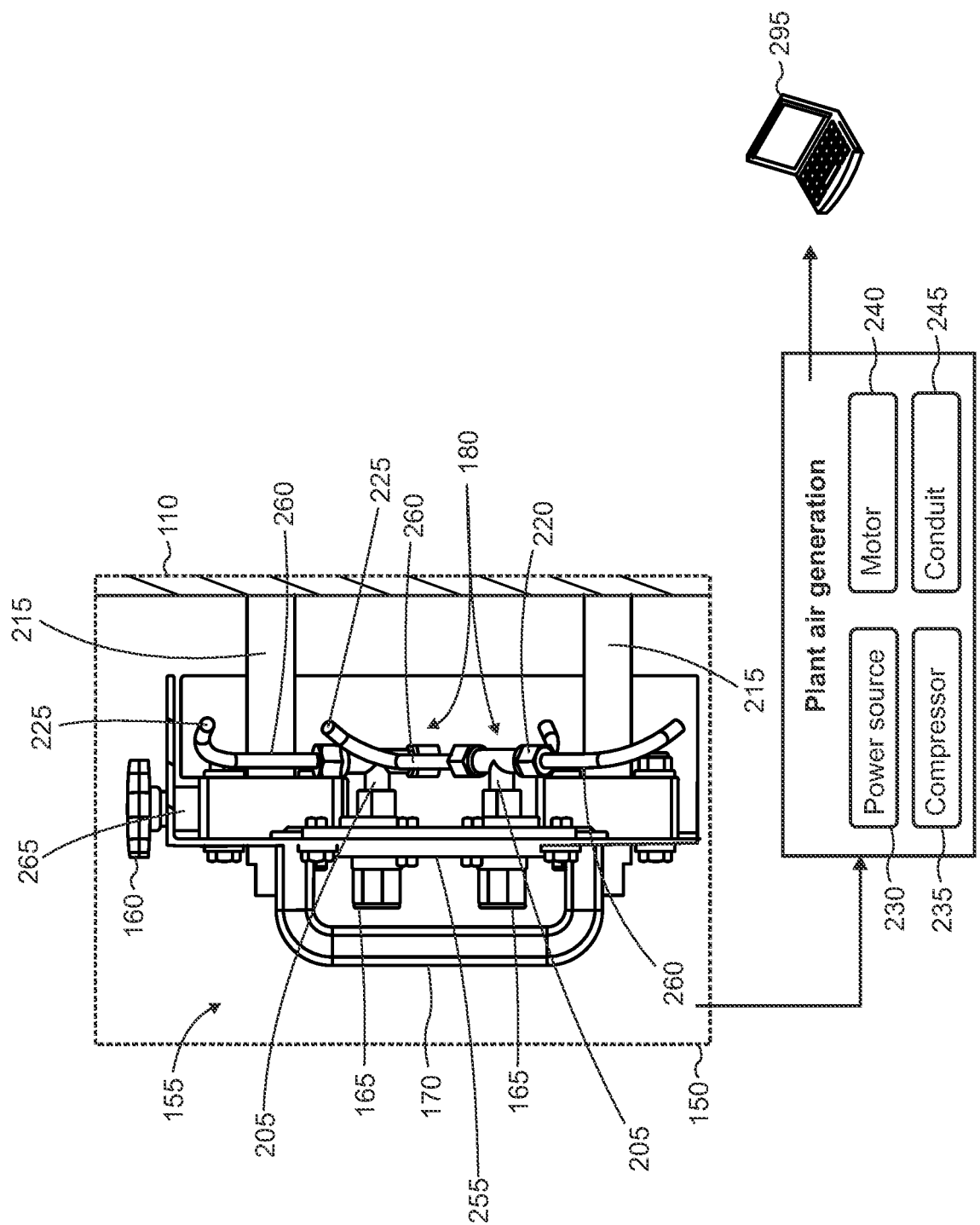
FIG. 2 shows an illustrative view of a cutout portion from FIG. 1.

FIG. 1 shows an illustrative representation in which a conveyor belt 110 that progresses along a conveyor belt frame 190 is advanced along a lower roller 140 and upper roller 145 to arrange the belt vertically. The rollers may be comprised of silicone, plastic, metal, a combination thereof, or any material that can facilitate the operations discussed herein. FIG. 2 shows a closer view of the cutout portion 150 from FIG. 1. The hanger bracket 185 is attached to a section of the conveyor belt frame 190 via, for example, screws, bolts, a clamp, etc.

Opposing hanger brackets 185 attach to opposing ends/sides of the conveyor belt frame 190 so that the brackets straddle the conveyor belt (see FIGS. 4-7). The hanger brackets may be substantially perpendicular to the conveyor belt's frame to facilitate the conveyor belt's vertical orientation. The conveyor belt is then manually manipulated over the upper and lower rollers 145, 140 to redirect and create a temporary vertical orientation of the conveyor belt for cleaning by the conveyor belt cleaner 105, which is generally comprised of a spinner manifold 155 and a catch tray assembly 115. The spinner manifold and catch tray assembly may be comprised of metal (e.g., steel, stainless steel, copper, etc.) and are further shown with various views in FIGS. 8-16.

By utilizing a hanger bracket 185 that temporarily orients the conveyor belt 110 vertically, product or food production can continue while the conveyor belt cleaner 105 performs its job, cleans debris from the belt, and does not interfere with the belt's dedicated operations. Additionally, the vertical approach reduces belt real estate occupancy so production can continue during cleaning. Conveyor belt production components can stay in place to continue cleaning since the conveyor belt cleaner occupies a small section of the conveyor belt. The conveyor belt continues on the conventional horizontally-oriented path after detouring to the conveyor belt cleaner section of the circuit.

The catch tray assembly 115 is adapted to catch any sesame seeds or other particles blown into it from the spinner manifold's cleaning heads 180. The catch tray assembly includes handles 120, a backplate 125, a base 135, and slots 175 that lock into pins 195 attached to the hanger bracket 185. The slots rest on the pins through gravity and are removable without tools; however, in other implementations, screws, bolts, press-fit, tab and notch, or other mechanisms may be used to secure the catch tray assembly in place. The catch tray assembly 115 further includes a vacuum port into which a vacuum hose may be positioned to suction out any removed particles from the conveyor belt resting on the base 135.

The spinner manifold 150 includes a frame 255 having handles 170 and inlets 165 that transfer air or another medium (e.g., spray, mist, chemicals, etc.) to blowers 180. The blowers 180 are comprised of an entry point 205 from which generated air from the inlet 165 advances through tubes (or nozzles) 260 and then output from respective outlets 225. The nozzles may be comprised of plastic, but other materials, such as silicone, metal, or another suitable polymer, are also possible. In the present implementation, the blowers have a tentacle-like structure to enable multiple powerful streams of air to be output against the conveyor belt 110. This may be helpful, for example, when smaller particles or debris like sesame seeds are stuck within the conveyor belt's apertures or crevices. The blowers are also on rotating assemblies which causes the blower's tentacles to rotate while outputting air and effectively covering more ground when blowing against the belt. The outlets of the blowers are configured and bent at a non-orthogonal angle relative to the belt to provide thrust to rotate the assemblies. The spinner has two halves, an inlet on a rear side of the spinner manifold and a pressed-in bearing on the cleaning head 180 side of the manifold that enables rotation and which holds the rotating assembly in place. These halves are designed to sandwich the in-between sheet metal to which they mount.

While air is discussed throughout the disclosure, the cleaning heads and system is also capable of outputting other media, including steam, water, sanitizing solution, dry ice crystals, etc. Each one of which can cause the functionality for air discussed herein, but may be better suited depending on the type of debris or particles intended to be cleaned on the conveyor belt, or depending on the conveyor belt's material itself. For example, air may work well for semi-dry debris, but steam would provide additional heat and emulsifying power for removing difficult, stuck-on debris (i.e. grease, jelly, honey, other sticky substances). A sanitizing solution could be sprayed onto the surface through this device, either as a stand-alone sanitizing solution or by first passing air through the device to clean, and then passing sanitizing solution through the same device. Dry ice, when ground into fine particles, could be introduced into the air stream to add agitation and abrasion, for additional cleaning. Dry ice is used in food environments because it leaves behind no residue and is considered food-safe.

The spinner manifold 155 may be connected to components that establish plant air generation, such as a power source 230 (e.g., battery or plugged into a power outlet), compressor 235, motor 240, and a conduit 245 through which the generated air travels to reach the inlets 165, among other operational components. The plant air may be filtered and regulated to provide 35-40 PSI (pounds per square inch). The conduit may be tubes that attach to respective inlets 165 via a clamping mechanism, press-fit, connector-receptacle connection, or another attachment mechanism. Knobs (or thumb screws) 160 are used to control a clamp bushing 265, which attaches to rails 215 extending from the hanger bracket 185. Clockwise and counter-clockwise rotations of the knobs cause the clamp bushing to engage with and disengage from respective rails 215. Using rails and clamp bushing enables a user to adjust the distance between the spinner manifold and the conveyor belt; that is, the user can clamp the spinner manifold at various positions along the rails. Additional knobs and components are shown in the ensuing drawings.

Figure 3:
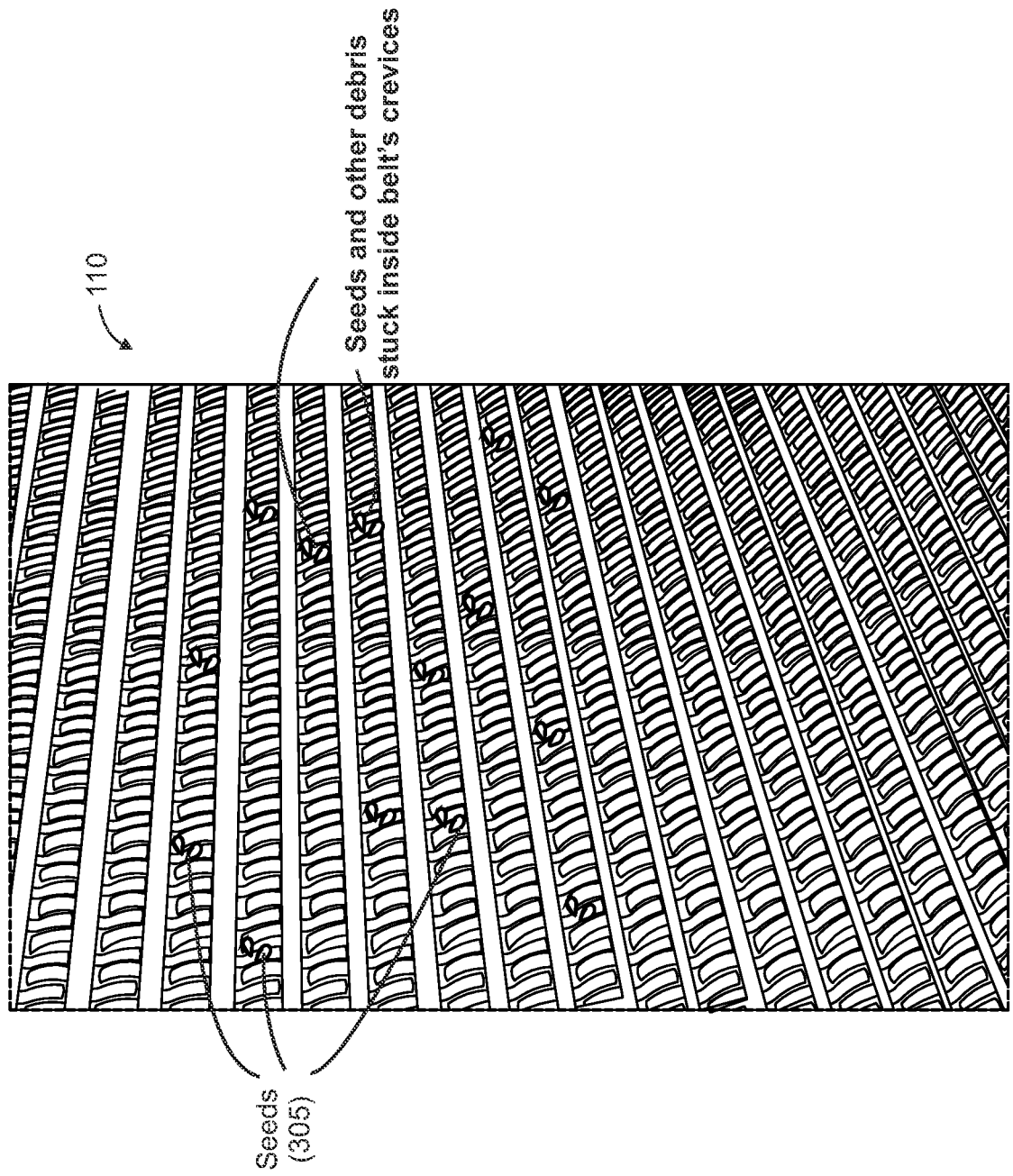
FIG. 3 shows an illustrative mesh conveyor belt with seeds and like particles stuck within the conveyor belt's apertures.

FIG. 3 shows an illustrative representation of a dirtied conveyor belt 110 with sesame seeds 305 and other debris stuck inside the belt's apertures and crevices. In this regard, the conveyor belt may be an open mesh belt used in bakeries and similar settings, which can cause small particles and foodstuffs to get stuck into the belt. The present conveyor belt cleaner 105 is adapted and designed to successfully rid the conveyor belt of at least small particles.

Figure 4:
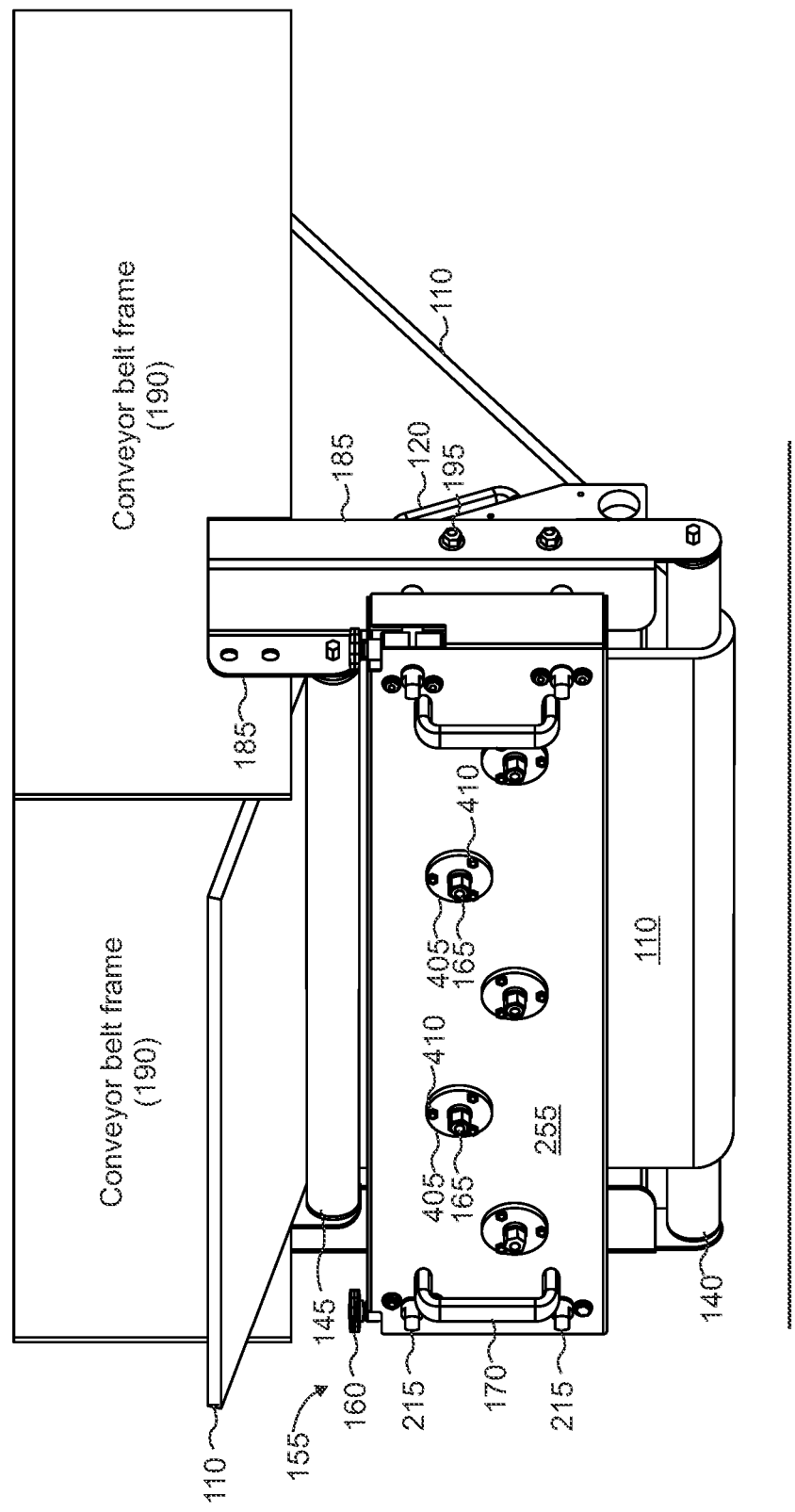
FIG. 4 shows an illustrative rear perspective view of the air-powered cleaning heads.

FIG. 4 shows an illustrative perspective representation of the spinner manifold 155 side of the conveyor belt cleaner 105. The inlets 165 include a base bracket 405 attached to a frame 255 via bolts 410. The inlet may be a rotatable threaded receptacle that can secure to a corresponding male socket attached to a tube, such as the conduit 245 (FIG. 2). Rails 215 extend from the hanging bracket 185 and enter through corresponding holes in the frame 255. The rotatable knob 160 is then utilized to engage the clamp bushing to the rails 215, thereby mounting the spinning manifold 155 to the hanger bracket 185.

Figure 5:
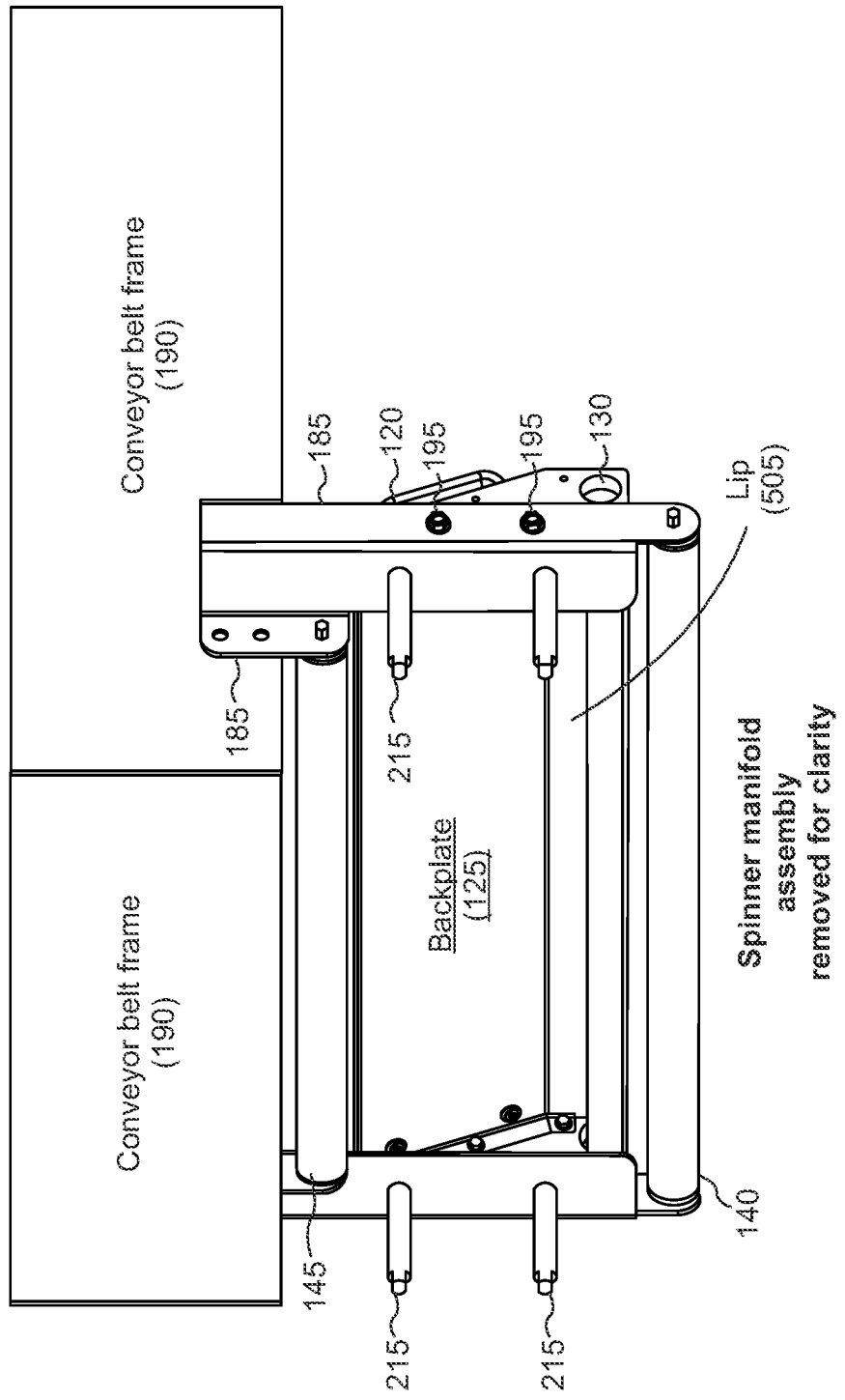
FIG. 5 shows an illustrative rear perspective view of the air-powered cleaning heads with the spinner manifold and conveyor belt removed.

FIG. 5 shows an illustrative perspective representation of the same view from FIG. 4 but with the spinner manifold 155 and conveyor belt 110 removed for clarity. The horizontally extending rails 215 from the hanging bracket 185 extend outward to secure the spinning manifold. A window is formed between the spinning manifold and the catch tray assembly 115 so that output air from the cleaning heads 180 (not shown in FIG. 5) engages with the conveyor belt 110 and then hits against the backplate 125 on the catch tray assembly 115. A lip 505 is shown adjacent to the base 135 (FIG. 1) to prevent flying debris from escaping from the catch tray assembly 115. Overall, the structure of the conveyor belt cleaner 105 may be compact such that space between the cleaning heads 180, conveyor belt 110, and catch tray assembly 115 is minimized. This can ensure that output air is not losing momentum while traveling to the conveyor belt and also prevent cleaned debris and seeds from escaping the conveyor belt cleaner unnecessarily and reaching the surrounding floor and environment.

The benefit of using an air-powered mechanism to clean the conveyor belt 110, as opposed to brushes in other embodiments, includes reducing contaminants (e.g., seeds and oils) from the belt from reaching the cleaning mechanism (unlike brushes). Furthermore, unlike brushes, the outlets 225 won't lose bristles and may wear relatively slower.

Figure 6:
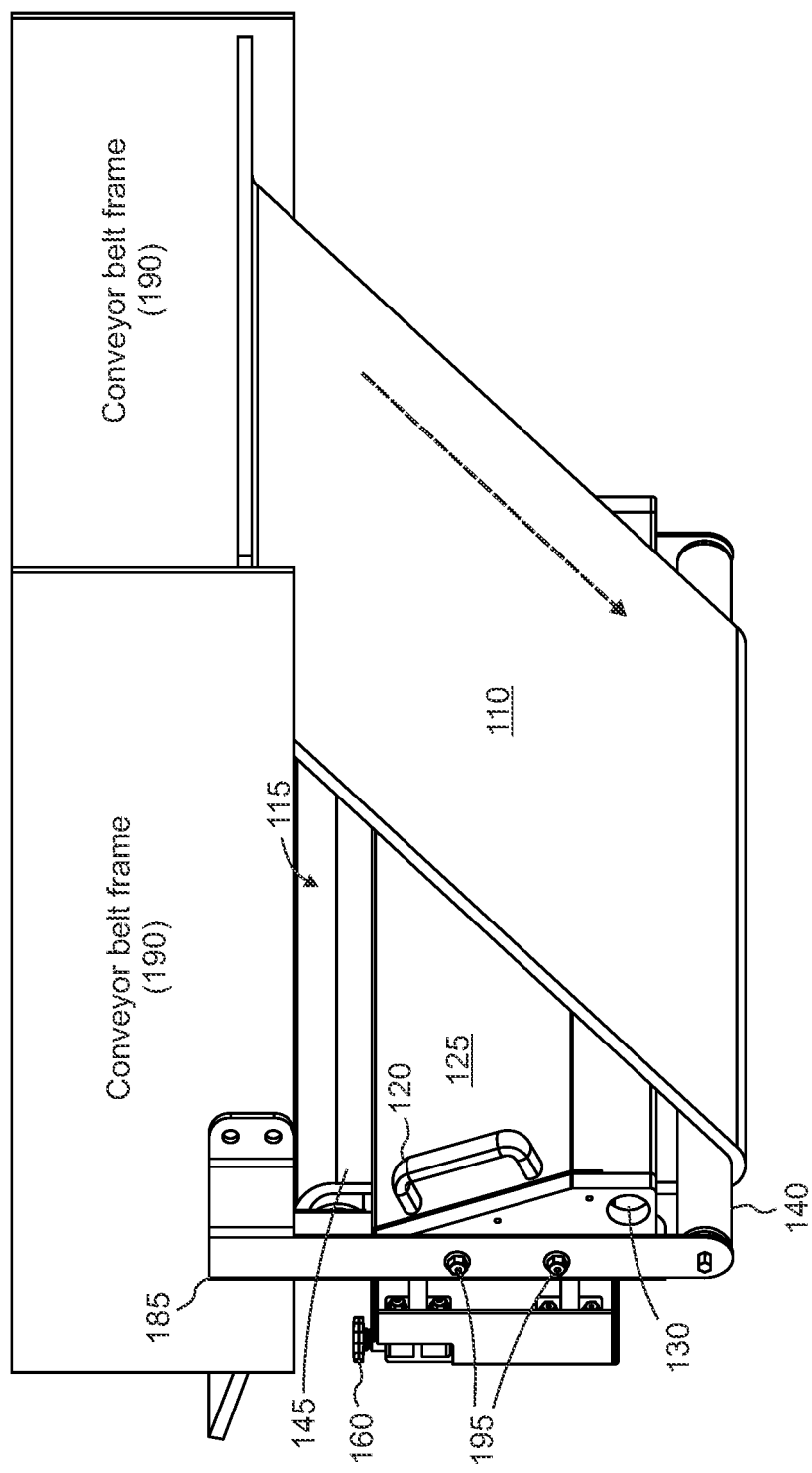
FIG. 6 shows an illustrative rear perspective view of the backplate that opposes the air-powered cleaning heads.

FIG. 6 shows an illustrative perspective representation of the catch tray assembly 115 side of the conveyor belt cleaner 105. Pins 195 extend inwardly from the hanging bracket 185 to enable a user to secure the catch tray assembly to the hanging bracket 185. A user may grasp handles 120 and rest the tray's slots (FIGS. 1 and 14-16) onto the pins.

FIG. 7 shows an illustrative perspective representation of the same view from FIG. 6 but with the catch tray assembly 115 and conveyor belt 110 removed for clarity in exposition. The pins 195 are shown, on which the catch tray's slots 175 would typically rest. The cleaning heads 180 are laterally positioned in front of the catch tray assembly to enable output air - or another medium in other examples - to engage with the conveyor belt and dislodged debris to hit against the catch tray's backplate 125.

The cleaning heads 180 include a mounting bracket 705, which secures to the frame 255 of the spinning manifold 155 via, for example, screws, bolts, or another fastening mechanism. As shown, the cleaning heads rotate 360 degrees while operating, which occurs responsive to air pushing through the tubes/nozzles 260 and the tubes' angled tips. In this regard, the mouting bracket 705 may include bearings in between the bracket and the manifold plate that enable rotational movement thereof which translates to the For example, the tubes' tips may form an obtuse angle greater than 90 degrees to stimulate and cause rotational movement. The angle may be anywhere from 91 degrees to 130 degrees. In some implementations, however, the angled tips of the tubes 260 may form acute angles less than 90 degrees to stimulate rotation. Alternatively, a hybrid approach of obtuse and acute angles for individual cleaning heads 180 may be used. Alternatively, some cleaning heads may form acute angles, and others may form obtuse angles.

FIGS. 8-11 show illustrative representations of the spinning manifold 155 from various angles. The various components shown have been described in greater detail above. Some components and the manifold as a whole may be better represented and observed in these drawings. For example, the clamp bushing 265 and its controlling knobs 160 on both ends of the manifold may be more observable. Furthermore, the holes 905, which receives the hanging bracket's rails 215 (FIGS. 4-5), are shown, to which the clamp bushing secures. The inlet of the cleaning heads have corresponding mounting brackets 910 that attach through to the outlet portion of the cleaning head. The spinner manifold (and corresponding catch tray assembly 115) can come in varying lengths to accommodate different belt sizes, but the overall structure and functionality may otherwise be the same with the increase or reduction of cleaning heads 180.

Figure 13:
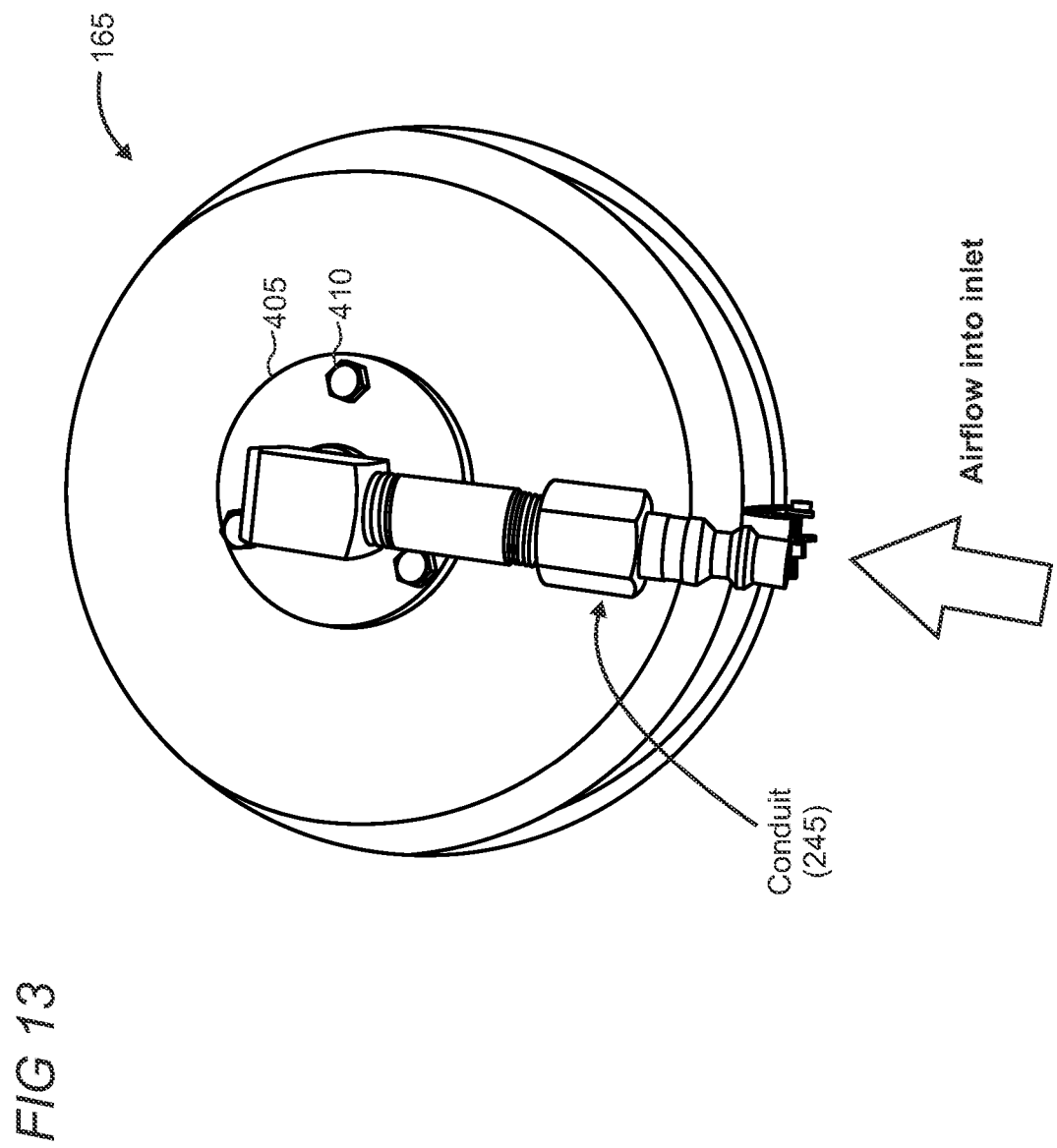
FIG. 13 shows an illustrative representation of the inlet assembly of the air-powered cleaning head.

FIGS. 12 and 13 show illustrative representations of the cleaning head 180 and the inlet 165 for the cleaning head, respectively. Plant air is routed from the inlet to the entry point 205 of the cleaning head and then travels through the tubes 260 and out the outlet 225. The airflow travels into the conduit 245 (which may extend to and from the air-generation source) and to the inlet 165 (FIG. 13), which is operatively connected to the cleaning head on the reverse side (FIG. 12) and output. A rotatable plate 1205 having bearings 1210 is connected to the mounting plate 705. The bearings are shown in broken lines to to represent that their placement is underneath the rotatable plate 1205 and engages with a surface of the mouting plate 705 responsive to air outflow. A figurative line showing the obtuse angle of the tube's tips is shown (e.g., "+90°"). Such a configuration causes the thrust for the rotational movement of the cleaning head when air is output by the nozzles, as representatively illustrated by the rotational arrow. In that regard, at least in this implementation, a motor that specifically causes rotational movement is unnecessary, but rather, generation and output of air is used as the thrusters. In other implementations, however, a dedicated motor, such as an electric motor, for rotation may also be used.

Figure 15:
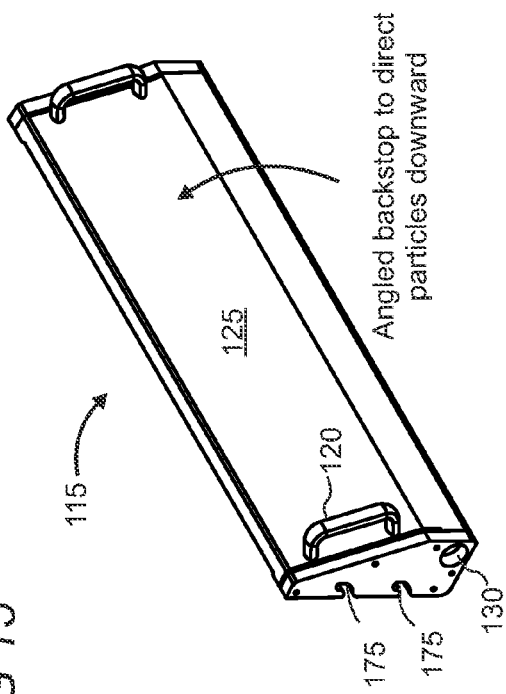
FIGS. 14-16 show illustrative representations of the catch tray assembly from different angles.
Figure 16:
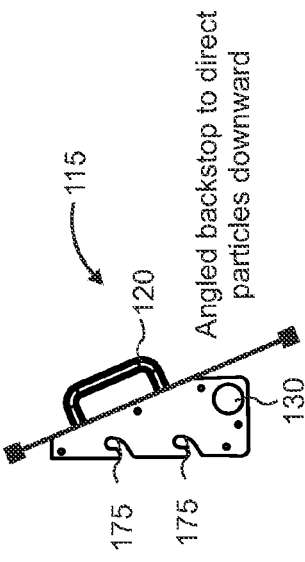
Figure 14:
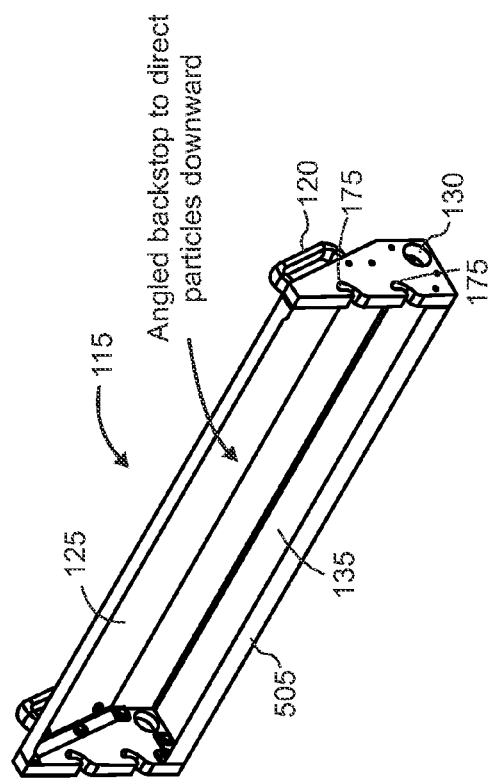

FIGS. 14-16 show illustrative representations of the catch tray assembly 115 from varying angles that may provide more observable details relative to the other drawings. For example, the slots 175 (although partially observable in FIG. 1) is adapted to receive, engage, and rest on respective pins 195. This enables a user to easily assemble the catch tray to the hanging bracket 185 and manually remove the catch tray for disassembly without tools. In other implementations, however, tools may be used if bolts or screws are used.

The vacuum port 130 is positioned adjacent to or at the base 135 of the catch tray assembly to vacuum debris. For example, a tube may be inserted into the port 130, and then a vacuum is switched on to suction up the debris dislodged from the conveyor belt 110. The vacuum port 130 is positioned behind the lip 505, which helps prevent dislodged debris from escaping the catch tray assembly. Furthermore, the backstop 125 is angled relative to the base 135 and the opposing spinning manifold (FIG. 1) to influence the direction of debris to the base upon hitting the backstop. Specifically, the backstop forms an acute angle relative to the base 135.

Figure 17:
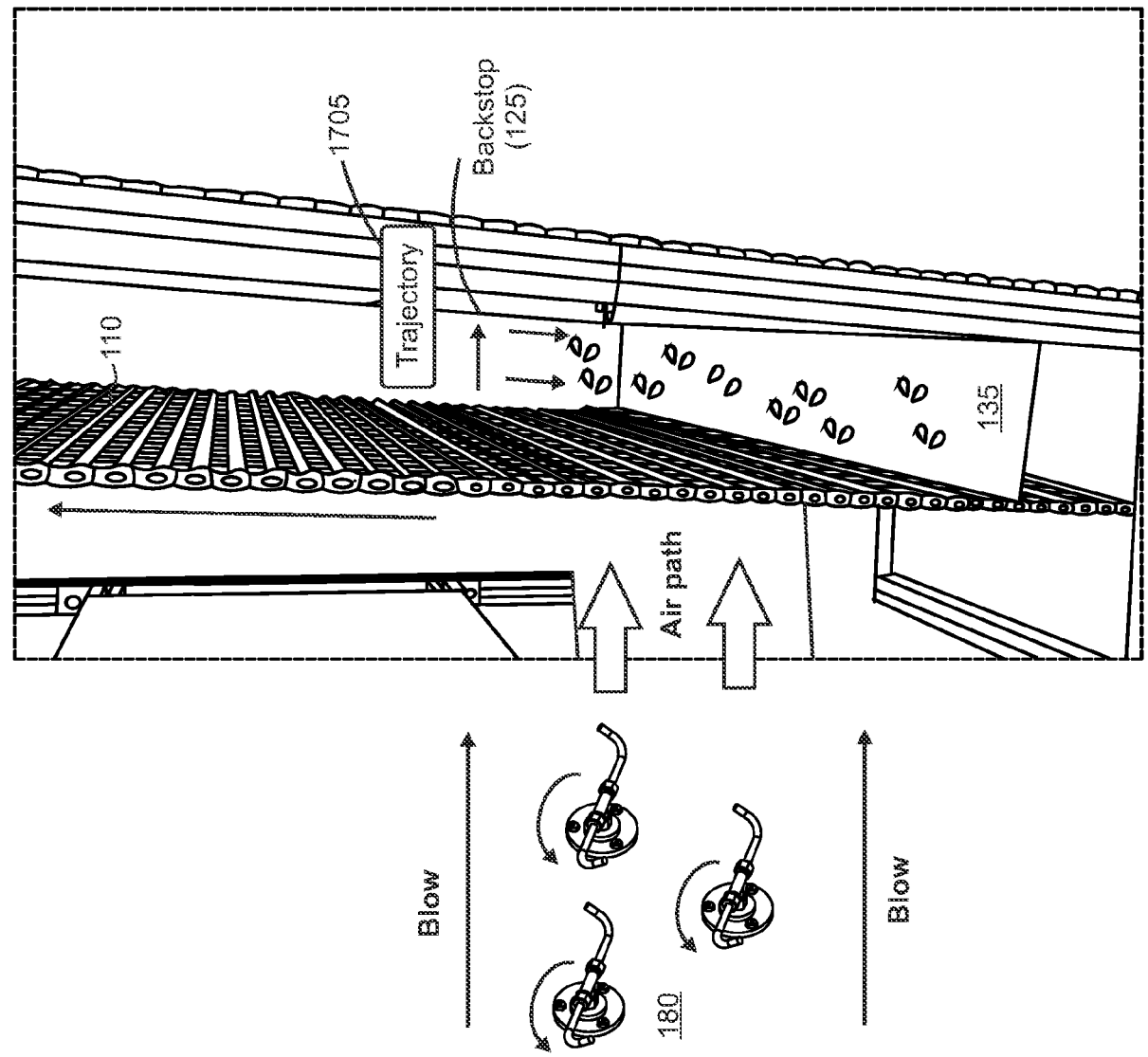
FIG. 17 shows illustrative representations of the air-powered cleaning heads laterally outputting air against a surface of a mesh conveyor belt for dislodging sesame seeds and particles into the catch tray assembly.

FIG. 17 shows an illustrative schematic representation of the conveyor belt cleaner 105 in operation. The cleaning heads 180, which would be attached to the spinner manifold's frame 255, rotatably output air against the vertically-oriented and advancing conveyor belt 110. Sesame seeds and other particles are dislodged and cleaned from the conveyor belt as air strikes it. Dislodged debris may then follow a trajectory 1705 of hitting against the backstop 125 of the catch tray assembly 115 and then dropping to the base 135 for subsequent cleanup (e.g., via vacuum port 130 (FIGS. 14-16)).

In alternative embodiments, a flat air knife may be utilized instead of or in addition to rotating spinners, in which case an electric motor may be used to make the air knife oscillate and provide extra agitation or cleaning power against the conveyor belt 110. In another alternative embodiment, a blower that injects air at one side of the conveyor belt may be used. A horizontally facing vacuum on the belt's opposite side can create a wind tunnel that carries seeds away and prevents buildup in the catch tray assembly 115.

Figure 18:
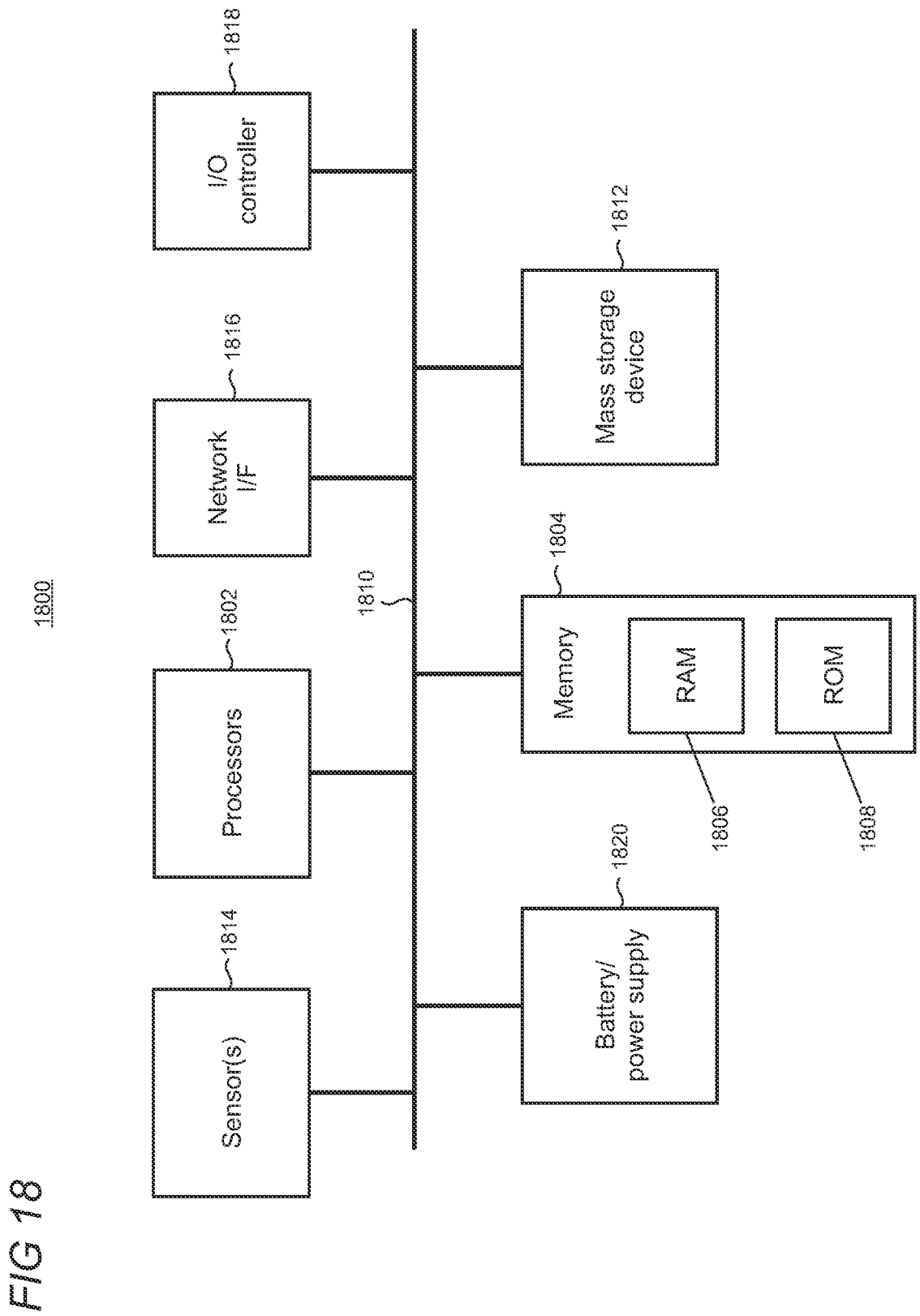
FIG. 18 is a simplified block diagram of an illustrative architecture of a control panel or user computing device that may be used at least in part to implement the present air-powered conveyor belt cleaner for small debris and particles; and Like reference numerals indicate like elements in the drawings. Elements are not drawn to scale unless otherwise indicated.

FIG. 18 shows an illustrative architecture 1800 for a computing device such as a control panel or user computing device (e.g., laptop computer, desktop computer, smartphone, etc.) that may be used to control the operations for the present air-powered conveyor belt cleaner for small debris and particles. For example, the architecture may control the blower generation from the computing device 295. The architecture 1800 may be non-exhaustive for a given computing device but may be utilized to execute the functions described herein.

The architecture 1800 illustrated in FIG. 18 includes one or more processors 1802 (e.g., central processing unit, dedicated Artificial Intelligence chip, graphics processing unit, etc.), a system memory 1804, including RAM (random access memory) 1806 and ROM (read-only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device, 1812 for storing software code or other computer-executed code that is utilized to implement applications, the file system, and the operating system. The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read-only memory), EEPROM (electrically erasable programmable read-only memory), Flash memory or other solid-state memory technology, CD-ROM, DVD, HD-DVD (High Definition DVD), Blu-ray, or other optical storage, a magnetic cassette, magnetic tape, magnetic disk storage or other magnetic storage device, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, control devices such as buttons and switches, or electronic stylus (not shown in FIG. 18). Similarly, the input/output controller 1818 may provide output to a display screen, user interface, a printer, or other output device types (also not shown in FIG. 18).

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors in different implementations of this description. Examples of such factors may include but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1800 may further include one or more sensors 1814 and a battery or power supply 1820. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A conveyor belt cleaner, comprising:
   a hanging bracket adapted to mount to a conveyor belt's frame;
   one or more rollers attached to the hanging bracket to manipulate a direction of the conveyor belt;

a spinner manifold having one or more cleaning heads, in which the spinner manifold attaches to the hanging bracket; and a catch tray assembly positioned adjacent to the spinner manifold and in a like direction of the one or more cleaning heads, wherein the catch tray assembly is adapted with at least a base to catch debris from the conveyor belt.

2. The conveyor belt cleaner of claim 1, wherein the one or more cleaning heads include a tube that output any one or more of air, steam, water, sanitizing solution, or dry ice cyrstals.

3. The conveyor belt cleaner of claim 2, wherein the one or more cleaning heads are rotatable about an axis.

4. The conveyor belt of claim 3, wherein the one or more cleaning heads are each configured with multiple tubes from each of which a medium is output.

5. The conveyor belt cleaner of claim 3, wherein a tip of the one or more cleaning heads tubes forms an obtuse angle to facilitate rotational movement.

6. The conveyor belt cleaner of claim 1, wherein the mounting bracket, when attached to the conveyor belt's frame, is oriented substantially perpendicular to the conveyor belt's frame.

7. The conveyor belt cleaner of claim 1, wherein the catch tray assembly further includes a backstop that forms an acute angle with the catch tray assembly's base, wherein the acute angle of the backstop causes captured debris toward the base.

8. The conveyor belt cleaner of claim 1, wherein the conveyor belt, when positioned around the one or more rollers, is temporarily vertically oriented along the conveyor belt frame and positioned between the spinner manifold and the catch tray assembly.

9. The conveyor belt cleaner of claim 1, further comprising one or more rails extending from the hanging bracket to which the spinner manifold engages.

10. The conveyor belt cleaner of claim 9, wherein the one or more rails respectively insert into one or more holes on the spinner manifold to secure the spinner manifold to the hanging bracket.

11. The conveyor belt cleaner of claim 1, wherein the catch tray assembly includes a lip from its base that prevents debris from escaping the catch tray assembly.

12. A medium-powered conveyor belt cleaner, comprising:
a hanging bracket adapted to mount to a conveyor belt's frame;

one or more rollers attached to the hanging bracket on which the conveyor belt travels;

a spinner manifold having one or more cleaning heads with nozzles to output a medium, in which the spinner manifold attaches to the hanging bracket; and a catch tray assembly positioned adjacent to the spinner manifold and in a like direction of the one or more cleaning heads' nozzles, wherein the catch tray assembly is adapted with at least a base to catch debris from the conveyor belt.

13. The medium-powered conveyor belt cleaner of claim 12, wherein the one or more cleaning heads are rotatable about an axis.

14. The medium-powered conveyor belt of claim 13, wherein the one or more cleaning heads are each configured with multiple tubes from each of which the medium is output.

15. The medium-powered conveyor belt cleaner of claim 13, wherein a tip of the one or more cleaning heads tubes forms an obtuse angle to facilitate rotational movement.

16. The medium-powered conveyor belt cleaner of claim 12, wherein the mounting bracket, when attached to the conveyor belt's frame, is oriented substantially perpendicular to the conveyor belt's frame.

17. The medium-powered conveyor belt cleaner of claim 12, wherein the catch tray assembly further includes a backstop that forms an acute angle with the catch tray assembly's base, wherein the acute angle of the backstop causes captured debris toward the base.

18. The medium-powered conveyor belt cleaner of claim 12, wherein the conveyor belt, when positioned around the one or more rollers, is temporarily vertically oriented along the conveyor belt frame and positioned between the spinner manifold and the catch tray assembly.

19. The medium-powered conveyor belt cleaner of claim 12, further comprising one or more rails extending from the hanging bracket to which the spinner manifold engages.

20. The medium-powered conveyor belt cleaner of claim 19, further comprising a thumb screw that causes clamp bushing to engage with and disengage from the one or more rails.

* * * * *